No. 735,738. PATENTED AUG. 11, 1903.
E. P. FOLLETT.
DEVICE FOR DRAFTING PATTERNS FOR GARMENTS.
APPLICATION FILED JULY 26, 1902.
NO MODEL.
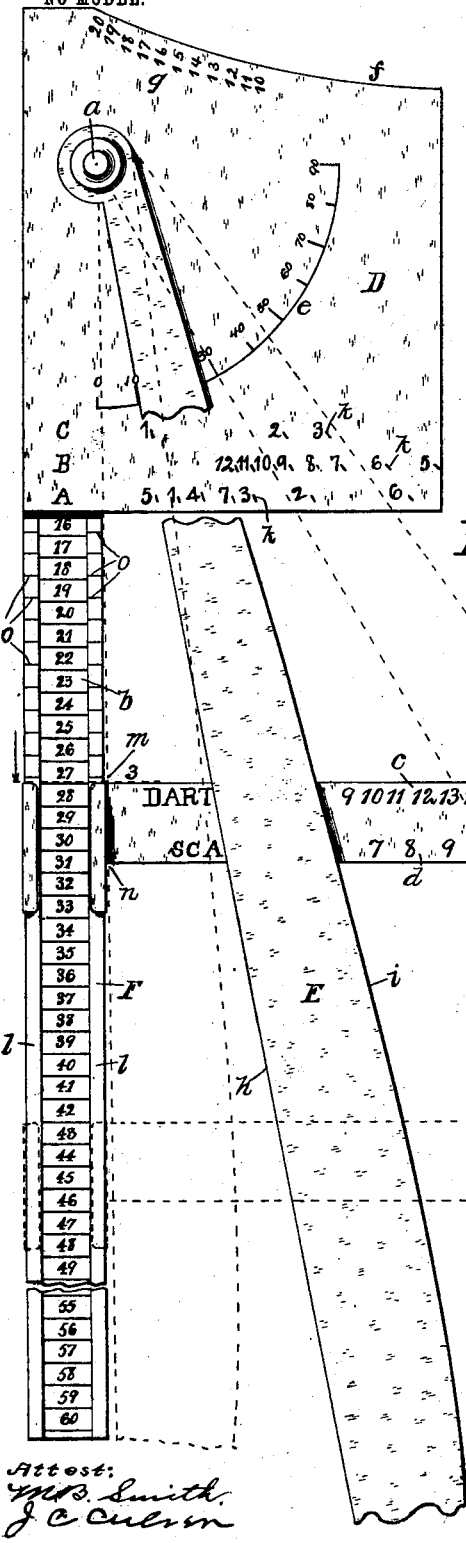
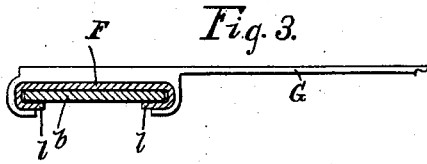
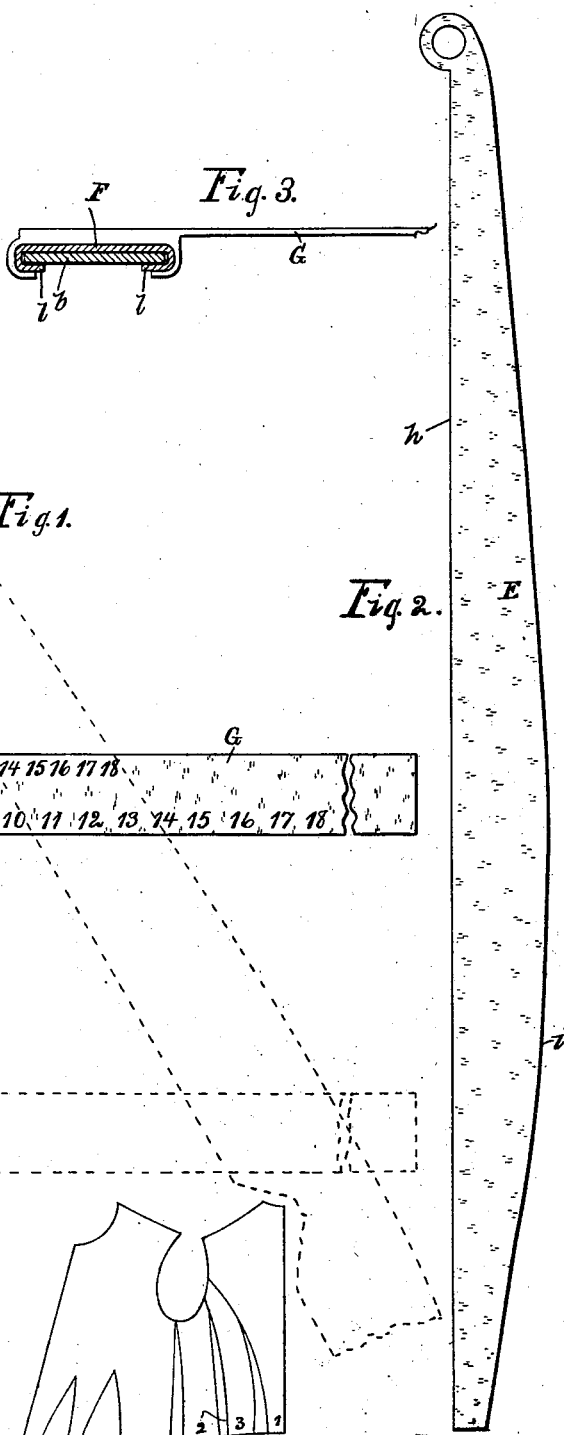
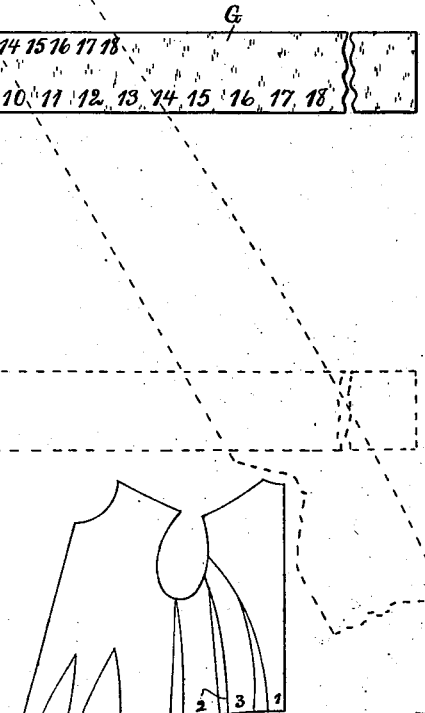
Attest:
M. B. Smith
J. C. Culver
Inventor:
Edward P. Follett
By E. B. Whitman, Atty.

No. 735,738. Patented August 11, 1903.

UNITED STATES PATENT OFFICE.

EDWARD P. FOLLETT, OF ROCHESTER, NEW YORK, ASSIGNOR TO THE ZENITH MANUFACTURING COMPANY, OF ROCHESTER, NEW YORK.

DEVICE FOR DRAFTING PATTERNS FOR GARMENTS.

SPECIFICATION forming part of Letters Patent No. 735,738, dated August 11, 1903.

Application filed July 26, 1902. Serial No. 117,105. (No model.)

*To all whom it may concern:*

Be it known that I, EDWARD P. FOLLETT, of Rochester, in the county of Monroe and State of New York, have invented a new and useful Improvement in Devices for Drafting Patterns for Garments, which improvement is fully set forth in the following specification and shown in the accompanying drawings.

My invention relates to devices for dividing short distances generally, but more particularly for getting proportional widths, as in garment-making or drafting patterns for garments, the invention being hereinafter fully described, and more particularly pointed out in the claims.

The main object of this invention is to provide a simple and convenient instrument for quickly dividing distances as measured upon the person and for getting proportional widths of parts, as of a garment.

A second object of the invention is to so construct the device that widths of darts of dress-waists for any given size or form may be quickly determined and marked off.

Other objects and advantages of the invention will be brought out and made to appear in the following specification, reference being had to the accompanying drawings, forming a part thereof.

Figure 1 is a plan of my improved device for obtaining relative widths and dividing short distances, parts being broken away and other parts shown in various positions by full and dotted lines. Fig. 2, drawn to a smaller scale, shows in full the swing-arm. Fig. 3, exaggerated, is a cross-section of the vertical scale-bar and scale, further showing the construction and the relation of the parts. Fig. 4 is a diagram of a waist.

D in the drawings is a metal plate or body, substantially rectangular in form, holding other parts of the device.

E is a swing-arm, it being preferably a strip of sheet metal, held pivotally at $a$ to the plate D to swing in a plane parallel with and close to the plate.

F is a vertical scale-bar rigid with the plate D at one corner, its edges $l\, l$ being commonly turned over to hold a scale $b$, Fig. 3. This scale $b$ is transversely marked with lines uniformly spaced and with a series of consecutive numbers, as from "16" to "60," in the spaces.

G is a slide-bar on the scale-bar F, adapted to move along the latter to correspond at its upper edge with any of the division-marks thereon. This slide-bar is marked with an upper and a lower dart-scale $c$ and $d$, respectively, each being numbered alike consecutively, as from "5" to "18," the numbers of each scale being equally spaced, but the spaces between the numbers of the lower scale being the wider.

The plate D is marked near its lower edge with three independent scales "A," "B," "C" for waists, skirts, and coats, respectively. The scale "A" is formed of short marks $k$, radial with the center $a$, irregularly spaced and designated, respectively, by the numbers "5," "1," "4," "7," "3," "2," "6," from left to right, as shown. The locations of these marks $k$ on the plate are determined by prearranged positions of the swing-arm E, acting with the slide-bar G, near which it crosses, the distances between the arm and the scale-bar F along the upper edge of the bar G being considered. These distances correspond with the various widths of the parts of the waist between the darts at one side at the waist-line, their sum being equal to one-half the waist measurement—that is to say, in forming the scale "A" the bar G is first set to indicate some convenient waist measurement—as twenty-seven inches, for example—on the scale-bar F. The swing-arm E is then swung away from the bar F through a distance measured along the upper edge of the bar G corresponding with the predetermined width of part 1 of the diagram, Fig. 4, and a mark $k$ made on the plate D at the straight edge $h$ of the arm E, said mark being numbered "1." The swing-arm is next moved to a position such that the distance between it and the bar F, taken along the bar G, will correspond with the width of part 2 of the diagram and a mark $k$ made, as before, on the plate D, numbering the same "2." Similarly, the remainder of the scale "A" is produced in the order numbered, reference being had to the widths of the numbered parts, respectively, of the diagram. Then in using the device for getting the proportional widths of corresponding parts of a pattern for waists of greater or less dimensions the slide-bar G is first adjusted upon the scale-bar F to correspond to the waist measurement required and the swing-arm E moved successively to the marks k from "1" to "7" consecutively, each distance between the swing-arm and the bar F being measured (along the bar G) and laid off on the pattern being drafted.

The marks k of the scale "B" on the plate D are obtained in a manner similar to that of constructing the scale "A" and numbered consecutively from right to left, as from "5" to "12." These numbers stand for the number of the gores in different skirts, all the gores of the same skirt, whether more or less in number, being equal in width at the waist-line. To illustrate, if the waist measurement be twenty-seven inches, for example, the arm E will be swung to the right until its distance from the scale-bar F along the bar G equals one-twelfth of twenty-seven inches and a mark k made on the plate D at the edge h of the arm and numbered "12." Likewise for an eleven-gored skirt the arm E would be swung so the distance between it and the bar F equals one-eleventh of twenty-seven and another mark k made, as before, on the plate. The remainder of the scale "B" is made in the same manner, and when constructed it will answer for obtaining the widths of the gores of skirts of any waist measurement indicated on the scale-bar F by the slide-bar G. This device, furthermore, thus constructed and marked will serve, as it will be seen, to quickly divide any given distance within limits into any number of equal parts.

The scale "C" has usually but three marks k, irregularly spaced and numbered "1," "2," "3," this scale being for coats and coöperating with the arm E in the same manner the marks of the scale "A" act with the arm.

It is obvious that the scale-bar F may have marks or numbers formed directly upon its face, as shown at o, instead of upon the strip of paper b held by the bar, this being a matter of choice and not of invention, the removable paper scale b being more commonly used, as it admits of being replaced by a scale differently marked. The plate D is also marked with a quadrant e, concentric with the pivot a, to coöperate with the swing-arm E for getting angles. This plate is also formed with a curved edge f and scale g for back and neck measurements.

The swing-arm E is formed with one edge h straight and radial or in line with the axis of the pivot a and the other edge i curved to give the forms of the sides of the darts and the shoulder-curves.

In dressmaking for reducing the size from bust measure to the smaller waist measure devices or lines known as "darts" are employed, these being each two corresponding curved lines marked on the lining of the waist to stitch to. These pairs of dart-lines are made concave toward each other, meeting in a common point above the waist-line and more or less spread at the opposite ends at the waist, the cloth between being commonly cut away. Four of these darts are commonly used in drafting a waist, a large and a small one being employed at each side of the waist under the arm, the divergency of the lines of each dart—that is to say, the width of the dart—depending upon the relative difference between the bust and the waist measurements in any given case. If, for example, the bust and the waist measures were thirty-six and twenty-four inches, respectively, the reduction would need to be twelve inches, or six inches on each side. Now the two scales c d on the bar G are formed, from which to quickly get the widths at the bases of the two unequal darts. To lay off the width of the small dart, this bar (which may for convenience be removed from the scale-bar F) is laid upon the cloth at the proper place and the cloth marked with a pencil at the two points m and "12" at the upper edge of the bar. Likewise to lay off the broad dart the bar is correspondingly shifted and the cloth marked at n and "12" on the lower edge of the bar, the number "12" in both cases indicating that the reduction from bust to waist measure is twelve inches. In a similar manner the width of darts for making any other reduction from bust to waist may be obtained, the different numbers on the two edges of the bar indicating the reduction in inches in every case. If, for example, in a given case the bust exceeded the waist by nine inches, the pencil-marks will be made at m and "9" of the upper scale and n and "9" of the under scale, or m and "18" and n and "18," respectively, if the difference between bust and waist were eighteen inches.

What I claim as my invention, and desire to secure by Letters Patent, is—

1. A device for drafting patterns for garments, comprising a holding plate or body marked with scales of numbers, a scale-holder carried by said holding-plate, a slide-bar on the scale-holder, and a bar held movably by said holding-plate having one edge curved to cross the slide-bar and coact therewith, the latter being marked with two scales of numbers alike as to figures but differently spaced, substantially as and for the purpose specified.

2. A device for getting proportional widths, as in garment-making, comprising a plate or body having three straight sides and a fourth curved side, a scale-bar secured to said plate or body, a slide-bar on the scale-bar, and a swing-arm carried by the plate or body having one edge straight and the other curved, said plate or body being marked with a series of independent waist, skirt and coat scales and a circular quadrant, substantially as and for the purpose set forth.

3. The drafting device herein described comprising a holding-body having a plurality of independent scales along its lower edge, a quadrant-scale and a curved edge with a scale, a vertical scale-bar extending from said holding-body, a scale adjustably mounted in said scale-bar, a slide-bar adjustable on said scale-body and a swinging arm pivotally mounted on the holding-body with its pivot concentric with the center from which the quadrant-scale is struck, said swinging arm having a curved edge and a straight edge, the scales on the holding-body being determined by prearranged positions of the swinging arm acting in conjunction with the slide-bar which it crosses; all substantially as and for the purpose specified.

In witness whereof I have hereunto set my hand, this 22d day of July, 1902, in the presence of two subscribing witnesses.

EDWARD P. FOLLETT.

Witnesses:
ENOS B. WHITMORE,
MINNIE SMITH.